United States Patent [19]

Okamoto et al.

[11] Patent Number: 4,939,732
[45] Date of Patent: Jul. 3, 1990

[54] METHOD AND SYSTEM FOR CHECKING ERRORS OF SIGNAL BEING TRANSFERRED THROUGH TRANSMISSION LINE

[75] Inventors: Koichi Okamoto, Kawasaki; Kousuke Nishimura, Komae; Kazuyoshi Miyazawa, Kawasaki; Kazuhiko Endo, Machida; Tamotsu Mikuni, Yokohama, all of Japan

[73] Assignee: Fujitsu Limited, Kawasaki, Japan

[21] Appl. No.: 251,212

[22] PCT Filed: May 26, 1988

[86] PCT No.: PCT/JP88/00508
§ 371 Date: Jul. 14, 1988
§ 102(e) Date: Jul. 14, 1988

[87] PCT Pub. No.: WO88/09590
PCT Pub. Date: Dec. 1, 1988

[30] Foreign Application Priority Data
May 29, 1987 [JP] Japan .................. 62-136784

[51] Int. Cl.$^5$ .............................. G06F 11/10
[52] U.S. Cl. ............................ 371/37.1; 371/32
[58] Field of Search ............ 371/32, 37, 38, 39, 371/40, 37.1

[56] References Cited

U.S. PATENT DOCUMENTS

| 3,473,150 | 10/1969 | McClelland | 371/32 |
| 3,475,723 | 10/1969 | Burton et al. | 371/32 |
| 4,144,522 | 3/1979 | Shibaura | 371/32 |
| 4,500,926 | 2/1985 | Yoshimaru | 371/37 |

FOREIGN PATENT DOCUMENTS 0155882A 9/1985 European Pat. Off.
1144700A 3/1969 United Kingdom.

OTHER PUBLICATIONS

*Patent Abstracts of Japan*, vol. 9, No. 83 (P-348) (1806), 4/12/85 & JP, A, 59213006 (Fujitsu K.K.) 12/1/84.
*Patent Abstracts of Japan*, vol. 7, No. 288 (E-218) (1433), 12/22/83 & JP, A, 58165445 (Hitachi Seisakusho K.K.) 9/30/83.
*IBM Technical Disclosure Bulletin*, vol. 29, No. 7, 12/86, (New York, US), "Error control for voice/data packet network," pp. 3092-3095.
*IBM Technical Disclosure Bulletin*, vol. 24, No. 11B, 4/82, (New York, US), D. F. Bantz: "Continuation package protocol," pp. 5805-5808.
*Patent Abstracts of Japan*, vol. 9, No. 102 (E-312) (1825), 4/4/85 & JP, A 59228440 (Fujitsu K.K.), 12/21/84.
*Patent Abstracts of Japan*, vol. 5, No. 7 (E-41) (679), 1/17/81 & JP, A, 55137742 (Nippon Denshin Denwa Kosha) 10/27/80.

*Primary Examiner*—Charles E. Atkinson
*Attorney, Agent, or Firm*—Staas & Halsey

[57] ABSTRACT

Errors occurring in information signals (each including control signals), dummy codes and attribute flags for the information signals and the dummy codes, transferred from a transmitting circuit to a receiving circuit through an interface line, with frames arranged in a serial transfer form are detected by using a cyclic redundancy check (CRC). The dummy codes and attribute flags for the dummy codes are not used in this checking. The re-transmission of signals in the frame resulting from a CRC error generated by the attribute flag for the dummy code changing to that of a control signal in the frame is avoided by: (1) providing, at the transmitting circuit, flags for determining the existence and the number of the control signal in the frame in front of the succeeding frame, and (2) comparing signals, relating to the flags, detected in the receiving circuit with the flags.

10 Claims, 10 Drawing Sheets

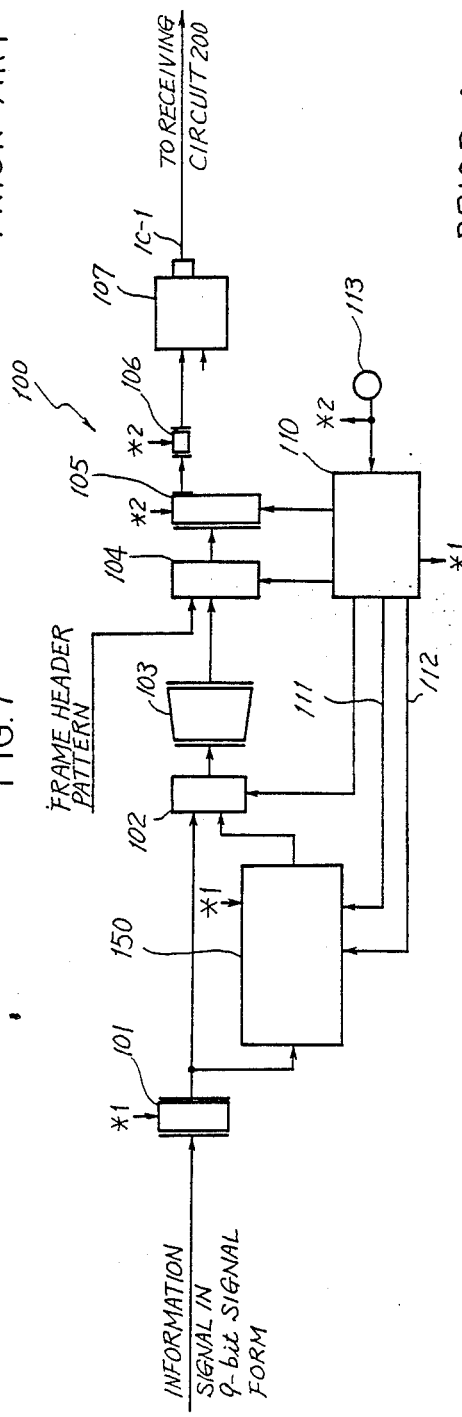
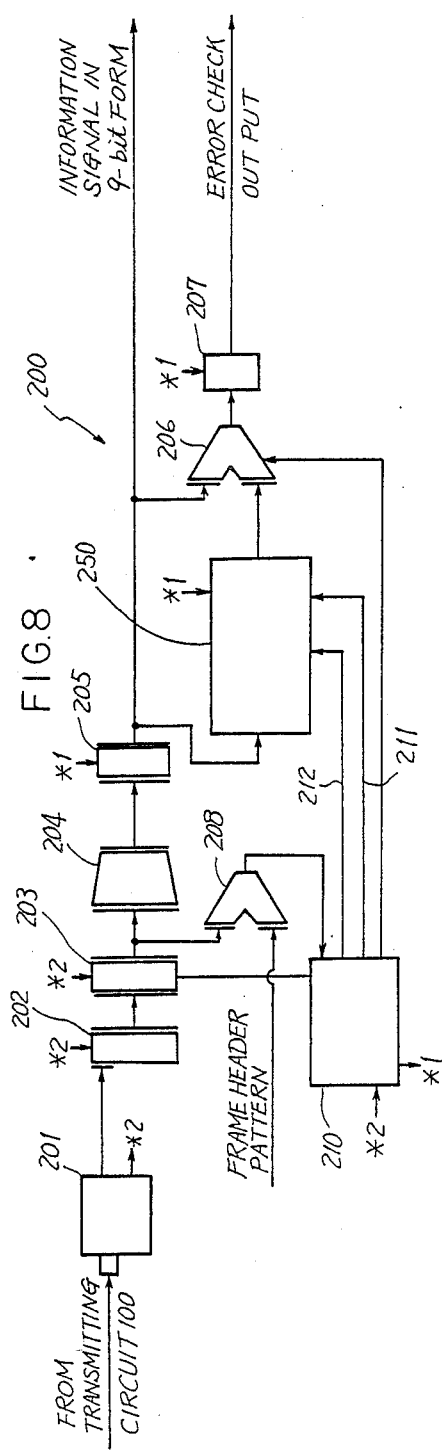
FIG.7 PRIOR ART
FIG.8 PRIOR ART

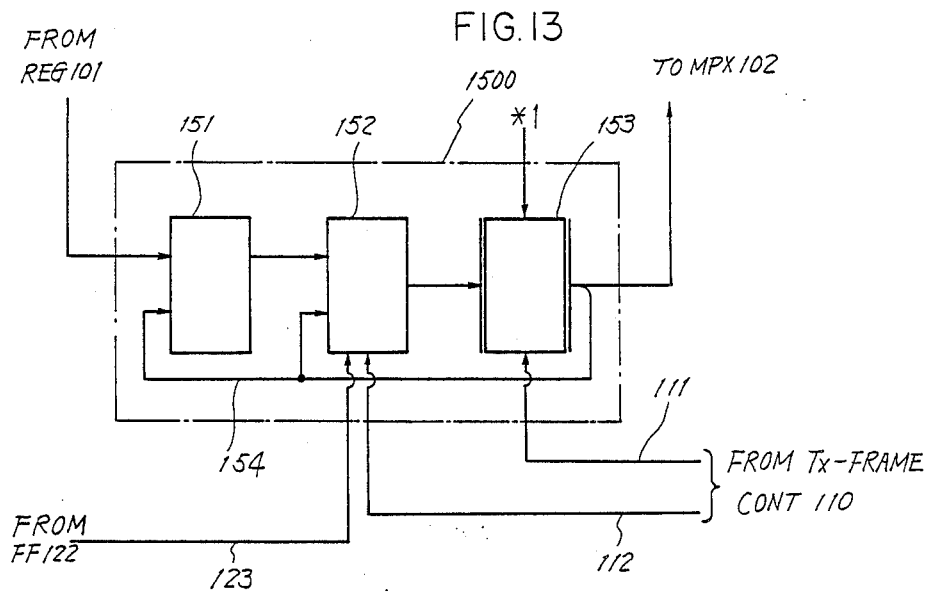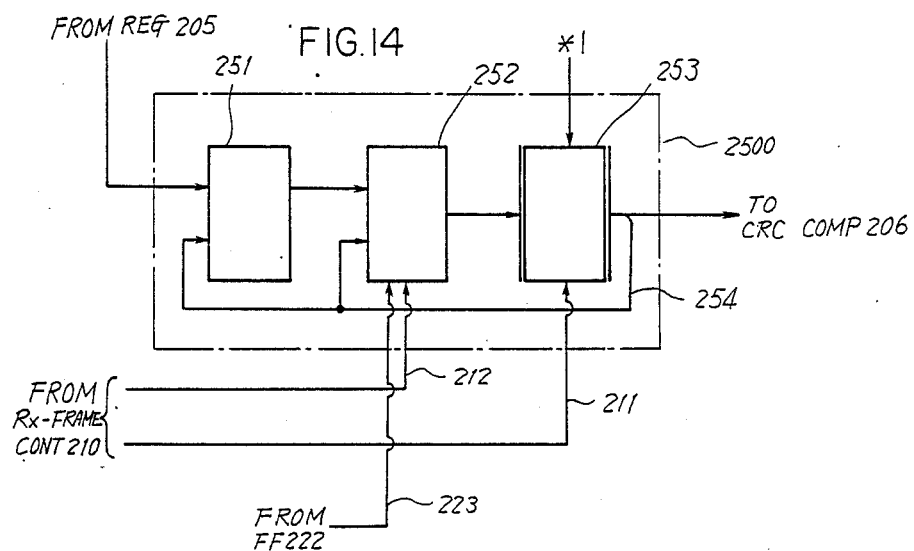

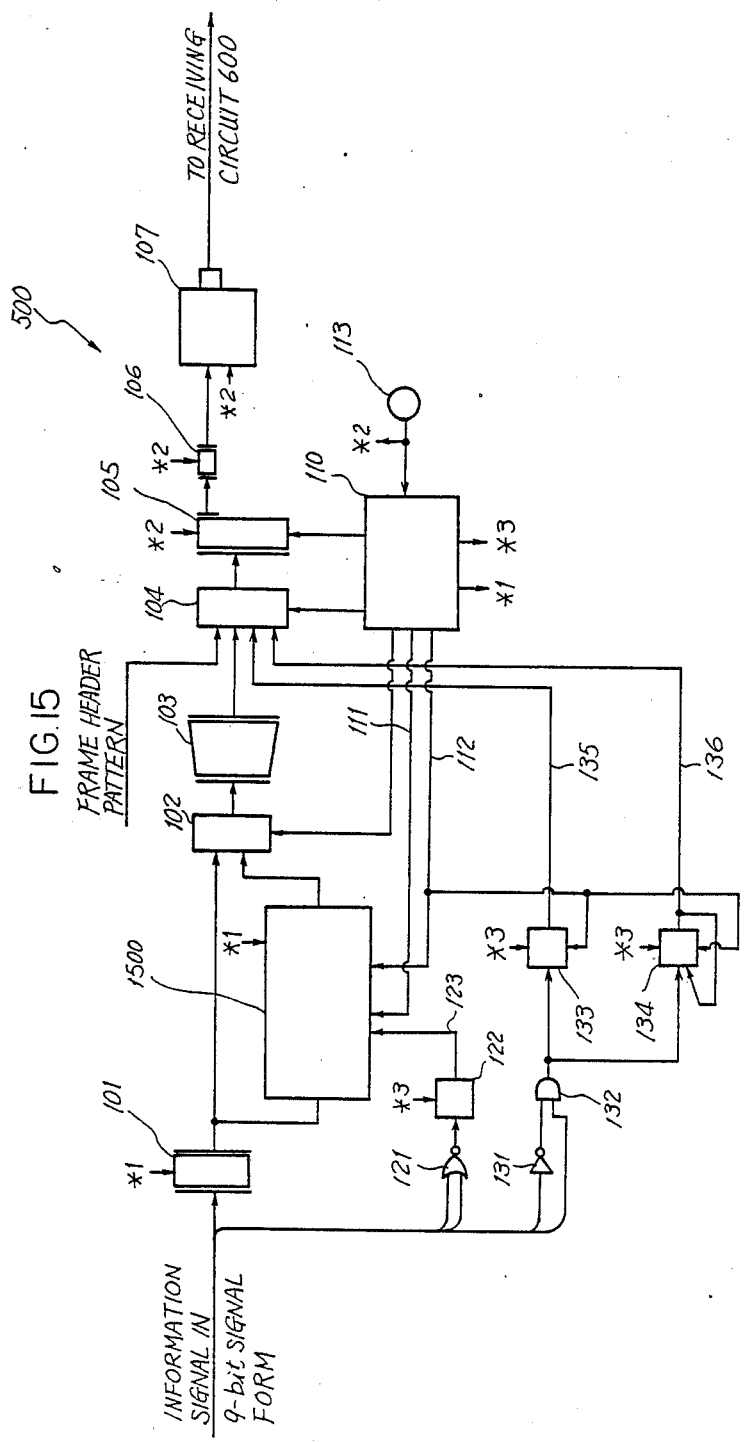

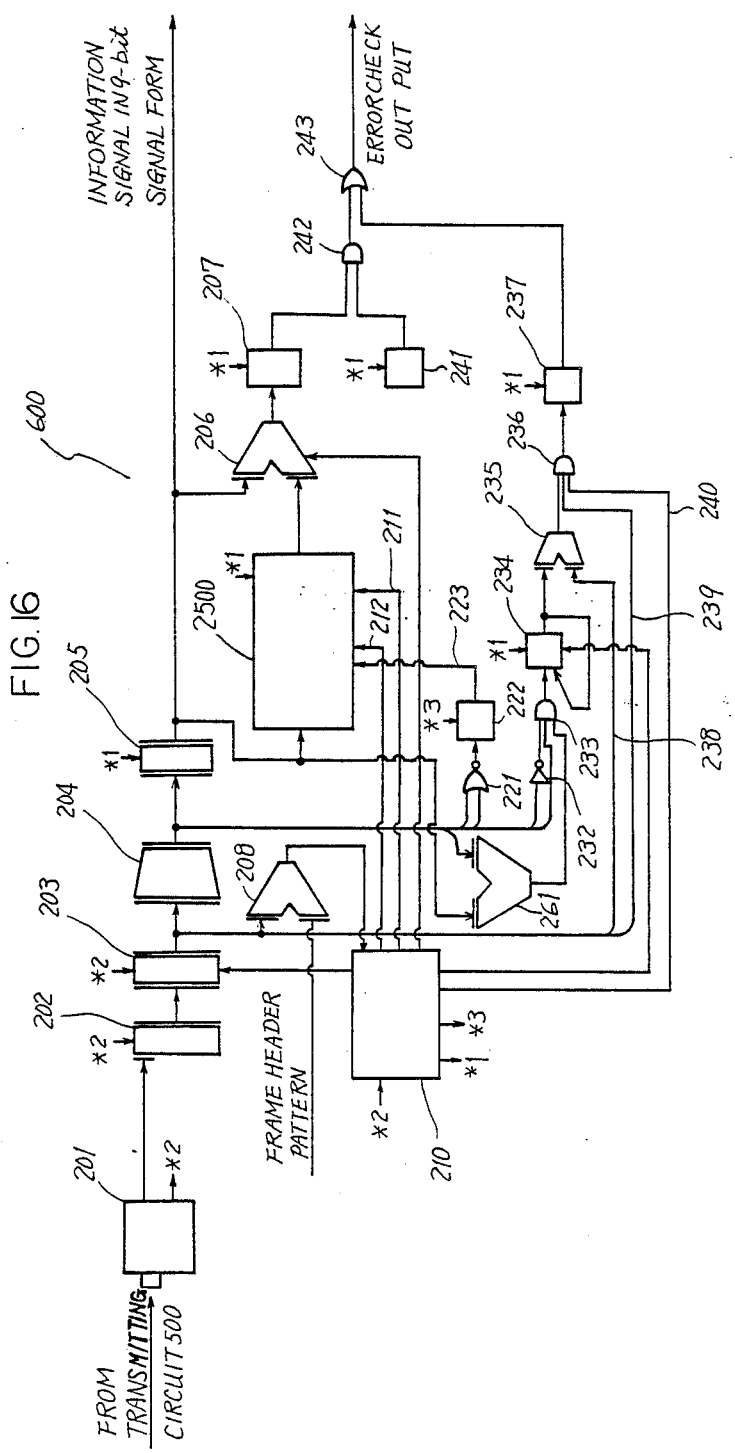

METHOD AND SYSTEM FOR CHECKING ERRORS OF SIGNAL BEING TRANSFERRED THROUGH TRANSMISSION LINE

DESCRIPTION

1. Technical Field

The present invention relates to a check of errors occurring in an information signal being transferred in a serial transfer form through a transmission line in a data processing system.

The data processing system is a system for integrating computers, memories and other data processing apparatus and comprises a first unit such as a channel unit, a second unit such as an input-output (IO) unit and a transmission line such as an interface line connecting the channel unit and the IO unit. In this disclosure, the channel unit, the IO unit and the interface line are defined the first unit, the second unit and the transmission line respectively, for simplicity hereinafter. The error check is performed at an interface circuit connected to the interface line and provided in the channel units and the IO units respectively.

As the processing speed or volume of the data processing system increases signal quantity transferred through the interface line increases. A signal transferred through the interface line, which will be called an "information signal" hereinafter, comprises a "data signal" and a "control signal". The data signal is a signal, for example, to be stored into or read out from a memory such as a main memory in the data processing system or a buffer memory in the IO unit. The "control signal" is a signal for controlling the data signal so as to be, for example, sent to some unit in the data processing system, stored into or read out from the memory.

2. Background Art

Formerly, coaxial cables were used as the interface line. However, when a coaxial cable is used, the information signal cannot be transferred at high speed because of a stray capacity distributed along the coaxial cable. Accordingly, many coaxial cables as much as one hundred had to be equipped for the interface line. Further, the size of each coaxial cable is not small. Accordingly, a large space was needed for the coaxial cables. To reduce the space, there is a parallel-series signal converting technique (P-S converting technique) for converting the information signals given in parallel into those in series. However, the P-S converting technique actually could not be applied to the coaxial cables because it still took too much time to transfer the information signal due to the stray capacity. The P-S converting technique has been brought into full play after an optical fiber technology has been established.

As is well known, the optical fiber is very small in size and has an excellent signal transfer speed. Applying the optical fibers to the interface line, the P-S converting technique became effective for the first time in transferring the information signal in a serial transfer form with successive frames. To arrange the information signal in the frames, a data buffer was used in the way that every time the information signal was transferred, bytes of the information signal were stored once into the data buffer and read out one by one, forming the frames. However, as long as the data buffer was used, the speed of the signal transfer was limited to low one, and there was a possibility that a trouble called "command overrun" would have occurred. These problems have been solved by introducing dummy codes into the frame instead of using the data buffer. The dummy codes are used so as to be always transferred between the channel unit and the IO unit through the interface line when there is no information signal to be transferred and replaced by the bytes of the information signal at any time the information signal is given to be transferred. However, there are still problems with the method and circuits for implementing the dummy codes technique, and the present invention is for solving the problems.

Before disclosing the present invention, the prior art frame construction, and the dummy codes and the information signal arranged in the frame will be explained, referring to FIGS. 2 and 3.

FIG. 2 shows an example of a frame construction 30 composed of a frame header 1, a plurality of signal transfer units 32, for example thirty two signal transfer units, for setting the control signals 3, the data signals 4 and the dummy codes 2, and a check code 5. A frame header 1 is provided at a beginning part of the frame 30 and a cyclic redundancy check (CRC) code 5 is provided at the end part of the frame 30. The control signal 3, the data signal 4 and the dummy code 2 are set properly in the signal transfer units 32. The parenthesized numerals in FIG. 2 shows their positions in which the set position for the control signals 3, the data signals 4 and the dummy codes 2 is an example. The frame header 1 is a beginning code of the frame 30, by which the start of the frame 30 is indicated and frame synchronization is performed. The CRC code 5 is for checking errors of the signals in the signal transfer units 32 as shown by a line 34 directed from every signal transfer unit 32 to the check code 5 in FIG. 2. As mentioned before, it has been a problem in the prior art that thus the dummy codes 2 are the object of error checking.

FIGS. 3(a) to 3(d) show the construction of the signal transfer unit 32. FIG. 3(a) is a transfer unit for transferring the dummy code 2, FIG. 3(b) is a frame for the control signal 3, FIG. 3(c) is a transfer unit for one-byte data signal 4 and FIG. 3(d) is a transfer unit for two-byte data signal 4. As shown in FIGS. 3(a) to 3(d), each signal transfer unit 32 includes eighteen bit-positions from bit 0 to bit 17 and is divided into two sub-units 21 and 22 that comprise bit-positions from bit 0 to bit 8 and from bit 9 to bit 17 respectively. The first and second bit-positions (bit 0 and bit 1) of the sub-unit 21 and those (bit 9 and bit 10) of the sub-unit 22 are attribute flags 11 in which "0 0" in FIG. 3(a) is for the dummy code 2, "0 1" in FIG. 3(b) is for the control signal 3 and "1" in FIGS. 3(c) or 3(d) is for the data signal 4.

When there is no information signal to be transferred, the attribute flag becomes "0 0" and only dummy codes 2 are placed in the sub-units 21 and 22 as shown in FIG. 3(a).

When the control signal 3 is to be transferred, the same control signals 3 are set in the sub-units 21 and 22 respectively as shown in FIG. 3(b). This is because these signals are compared to each other to check for errors in the control signal 3 during the signal transfer. This checking will be called a double check hereinafter. Because the double check is performed on the control signal 3, the control signal 3 is very important for controlling the data signal 4.

When the one-byte data signal is transferred, the attribute flag at the sub-unit 21 is set to "1" and the attribute flag of the sub-unit 22 is set to "0" as shown in FIG. 3(c), and the one-byte data signal is set instead of the dummy codes 2 in bit 1 to bit 8 of the sub-unit 21 and another one-byte data signal is set in bit 10 to bit 17 in the sub-unit 22 so as to have a bit-form inverted to that of the regular data signal 4. This is to avoid mistaking the control signal 3 for the data signal 4. That is, if the first bit of the one-byte data signal is "1" and the one-byte data signal set at bit 10 to bit 17 were not inverted, and when bit 0 of the attribute flag is mistaken "0" for "1", the first two bits in both sub-unit 21 and 22 become "0 1" respectively as if they were the attribute flag to the control signal 3.

When the two-byte data signal is transferred, the attribute flag of respective sub-unit become "1" at bit 0 and 9 as shown in FIG. 3(d), and the two-byte data signal is set at bit 1 to bit 8 and bit 10 to bit 17 of the two sub-units 21 and 22 respectively. When the data signal composed of more than two bytes, for example, three bytes, the third byte of the three-byte data signal is set at the next sub-unit, setting the attribute flag to "1" respectively.

FIG. 1 is a block diagram for illustrating basic construction of an interface line 1c, made of optical fibers, connecting between a channel unit 1a and an IO unit 1b. The interface line 1c consists of two lines: a line 1c-1 for the signal transfer from the channel unit 1a to the IO unit 1b and a line 1c-2 for the signal transfer from the IO unit 1b to the channel unit 1a.

As seen from FIG. 1, either the channel unit 1a or the IO unit 1b becomes a unit for transmitting or receiving the information signal. When the receiving unit receives the frame 30, the receiving unit firstly checks the attribute flag. If the attribute flag is "0 0", the receiving unit recognizes that only the dummy codes 2 are received, so that the receiving unit does nothing. If the attribute flag is "0 1", the receiving unit recognizes that a control signal 3 is received, so that the receiving unit operates in accordance with a command given from the control unit, such as "connect" which includes "read" and "write", "accept" or "end". If the attribute flag is "1 x", the receiving unit recognizes that the data signal 4 is received. Then, the receiving unit operates so as to, for example, store the data signal 4 into a buffer memory in accordance with the control signal 3.

When an error in the information signal is detected by the CRC code 5 at the receiving unit, at least a frame including the error must be re-transmitted, and sometimes, many information signals happen to be re-transmitted with a plurality of frames. Meanwhile, after the optical fibers have been applied to the interface line, the transfer speed of the signals is tremendously increased, so that the frequency of transferring the dummy codes 2 increases. Therefore, the signal re-transmitting because of the error of the attribute flag "0 0", causes to reduce totally the signal transfer speed in the data processing system.

Particularly, in a case where the data signal 4 stored in a buffer memory of the IO unit 1b is read out and sent to the channel unit 1a through the optical fiber 1c-2, mostly the dummy codes 2 are transferred and sometimes the control signals 3 are transferred through the optical fiber 1c-1. In such case, if an error occurs in the dummy code 2 passing through the optical fiber 1c-1 as if it were the control signal 3, not only the dummy codes 2 but also the data signals 4 through the optical fiber 1c-2 must be re-transmitted. Because, it may be considered that an error might occur in the control signal 3 transferred through the optical fiber 1c-1, and moreover the control signal 3 is very important for controlling the data signals 4. The error in the dummy code 2 could be neglected. However in the prior art there is no way to detect what is a true error. The above is an example but there have been many other problems same as the above in the data processing system. These cause a decrease in the overall signal transfer speed of the data processing system, and this kind of problem could not be solved as long as the dummy code 2 was the object of error checking.

SUMMARY OF THE INVENTION

An object of the present invention is to reduce the re-transfer frequency of the information signal due to the errors occurring in the dummy codes during the transfer of a serial information signal through the interface line consisting of optical fibers, in a data processing system.

Another object of the present invention is to increase the transfer speed of the information signal.

Still another object of the present invention is to increase the information quantity transferred through the interface line.

These objects are accomplished by excluding the dummy code from the checking (CRC) object for the information signal in the frame This exclusion is performed, at the interface circuits connected at the both ends of the interface line that includes a transmitting circuit and a receiving circuit respectively. However, when this exclusion is performed, it must be considered that the attribute flag "0 0" for the dummy code 2 may be changed to "0 1" as an error as if it were the attribution flag for the control signal. Therefore, the exclusion must be performed in consideration of the error due to the attribution flag "0 0". Considering the above, the exclusion is carried out by the following steps: (Before explaining the steps, it must be made clear for easily understanding the steps that in the description of the following steps, two frames, called a first frame and a second frame, will be used, defining that the first frame is a frame just front of the second frame.)

(step 1): providing, at the transmitting circuit, a novel flag called a first flag in the frame header 1 of the second frame for informing whether the control signal is in the first frame;

(step 2): providing, at the transmitting circuit, another novel flag called a second flag in the frame header 1 of the second frame for informing the lowest digit bit of the number of the attribute flag "0 0" in the first frame;

(step 3): detecting, at the transmitting and the receiving circuits, whether the attribute flag "0 0" for the dummy code 2 is in the first frame and producing bit "1" every time the attribute flag "0 0" is detected in the first frame;

(step 4): controlling CRC units in the transmitting and the receiving circuits so as to stop the CRC counting for the attribute flags "0 0" and the dummy codes 2 in the first frame, using the bit "1" at the (step (3), for excluding every attribute flag "0 0" and dummy code 2 from the CRC object for the information signal in the first frame;

(step 5): comparing, at the receiving circuit, the CRC code 5 in the first frame and that produced in the receiving circuit, and producing output bit "1" if they are not coincided;

(step 6): providing information whether at least one data signal 4 is in the first frame, to the receiving circuit from a control unit of the data processing system, and producing bit "1" if there is the data signal 4 in the first frame;

(step 7): detecting, at the receiving circuit, whether the attribute flag "0 1" for the control signal 3 is included in the first frame and comparing this output with the first flag and producing output bit "1" when they are coincided;

(step 8): counting, at the receiving circuit, the number of the flag "0 1" in the first frame and producing the lowest digit bit of the counted number and comparing this lowest digit bit with the second flag, and producing bit "0" if the both digit bits are coincided;

(step 9): producing bit "0" when the bit "1" at the step 7 and bit "0" at the step 8 exist;

(step 10): taking AND of the outputs at the steps 5 and 6; and (step 11): taking OR of the outputs of the steps 9 and 10.

The steps (3), (4) and (5) are for performing the error checking (CRC) of the information signal in the first frame, excluding the attribute flags "0 0" and the dummy codes 2 in the first frame, the step (6) is for considering the data signal 4 s that if the CRC error exits and when the data signal 4 is in the first frame, it must be determined that the information signal in the first frame must be re-transmitted, and other left steps are for considering the error due to the attribute flag "0 0". Particularly, because of providing the second flag in the second frame as stated in the step (2), the re-transmission of the information signal in the first frame becomes unnecessary even though the control signals 3 are in the first frame with dummy signals 2 and the attribute flag "0 0" is changed to "0 1".

BRIEF DESCRIPTION OF THE DRAWINGS

FIG. 7 is block diagram for the transmitter circuit of the prior art;

FIG. 8 is a block for the receiving circuit of the prior art;

FIG. 13 is a block diagram for a CRC unit embodying the present invention in the transmitting circuit;

FIG. 14 is a block diagram for a CRC unit embodying the present invention in the receiving circuit;

FIG. 15 is a block diagram for a transmitter circuit embodying the present invention; and FIG. 16 is a block diagram for a receiving circuit embodying the present invention.

DESCRIPTION OF THE PREFERRED EMBODIMENTS

Before disclosing the preferred embodiment of the present invention, a transmitting circuit 100 of the prior art and a receiving circuit 200 of the prior art will be explained, referring to FIGS. 7 and 8 respectively; Also a transmitter-CRC (Tx-CRC) unit 150 of the prior art in the prior art transmitting circuit 100 and a receiver-CRC (Rx-CRC) unit 250 of the prior art in the prior art receiving circuit 200 will be explained, referring to FIGS. 9 and 10 respectively.

Figure 1:
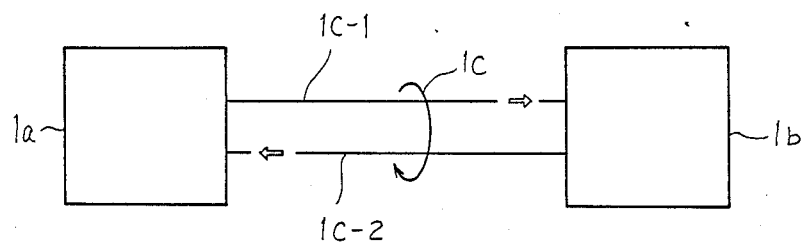
FIG. 1 is a block diagram for illustrating an interface line connecting a channel unit and an IO unit in the data processing system.
Figure 2:
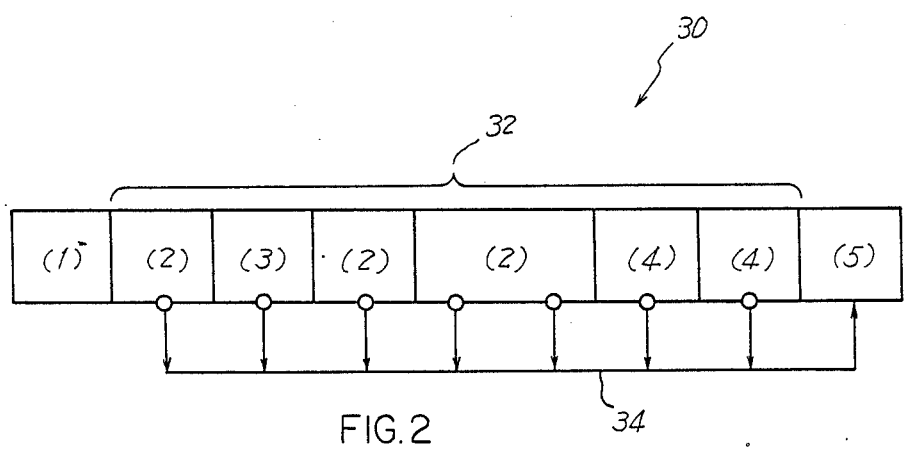
FIG. 2 is a figure for illustrating the construction of a frame in which the CRC checking objects, in the prior art, for the information signal.
Figure 3:
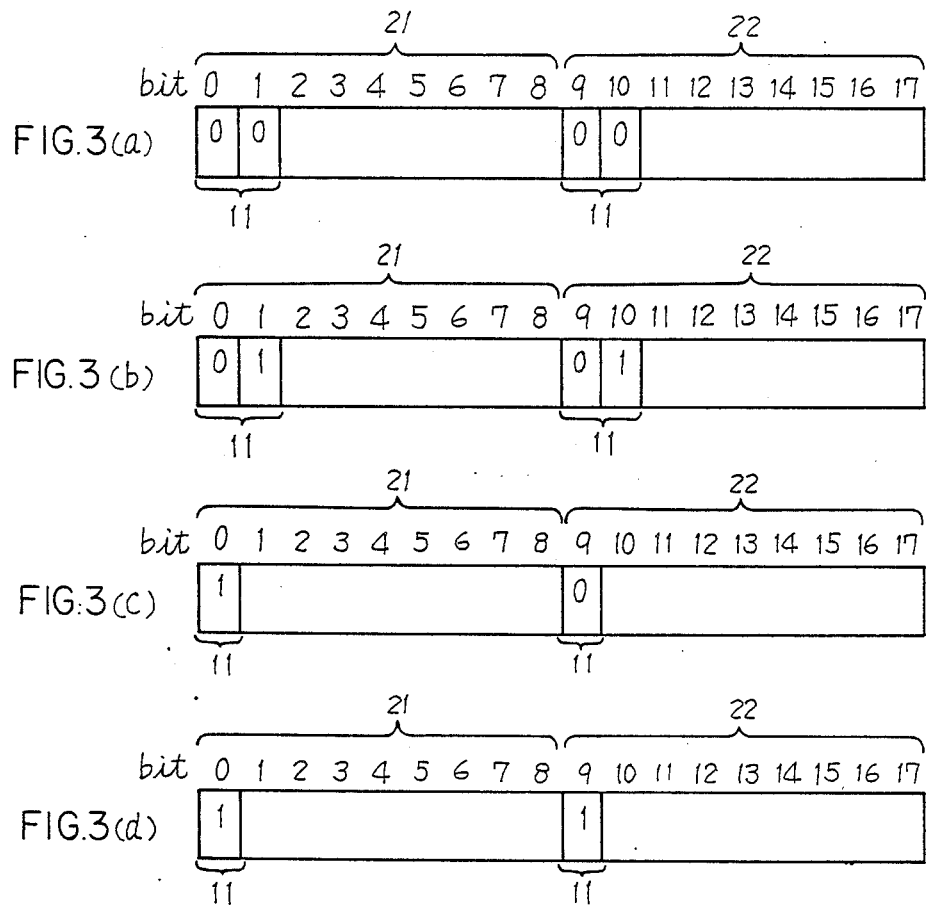
FIG. 3(a) is a figure for illustrating a signal transfer unit, in the frame, setting the dummy codes.
FIG. 3(b) is a figure for illustrating the signal transfer unit setting the control signal.
FIG. 3(c) is a figure for illustrating the signal transfer unit setting the one-byte data signal.
FIG. 3(d) is a figure for illustrating the signal transfer unit setting the two-byte data signal.

FIG. 7 is a block diagram of a transmitting circuit 100 of the prior art in the interface circuit located at, for example, the channel unit 1a (see FIG. 1). In FIG. 7, the information signal comprising a plurality of 9-bit signals each being such a signal placed at the bit position from bit 0 to bit 8 or from bit 9 to bit 17 in FIGS. 3(a) to 3(d), is sent to a resister (REG) 101. Through the REG 101, the 9-bit signal is sent to a multiplexer (MPX) 102 and also to a Tx-CRC unit 150. The Tx-CRC unit 150 comprises a CRC circuit from which the CRC code 5 is produced and sent to the MPX 102. In the MPX 102, the 9-bit signals and the CRC code 5 are sequentially selected and sent to a code converter 103. In the code converter 103, the 9-bit signals and the CRC code 5 are converted into a 12-bit signal respectively for obtaining approximate 50 % of a mark ratio of bit "0" to bit "1" in the 12-bit signal, which is a well known means for obtaining proper signal processing. The converted signal is then sent to MPX 104 at which a frame header pattern signal for the frame header 1 is added. Wherein, the frame header pattern is sent from a frame header pattern signal generator, which is not depicted in FIG. 10, in the the interface circuit in, for example, the channel unit. 1a. The frame header pattern signal, 12-bit signals and the CRC code 5 are sent to a shift REG 105 and changed therein so as to become an information signal arranged into the frame as shown in FIG. 2. That is, the shift REG 105 functions as a parallel series converter for forming the information signal. The information signal from the shift REG 105 is sent to an optical transmitter 107 through a REG 106 so as to be converted into an optical information signal and transmitted toward the receiving circuit through the optical fiber 1c-1 for example. A circuit having a reference numeral 110 is a transmitting frame control circuit (Tx-FRAME CONT) in which various timing signals are provided, using an original clock signal generated at a clock generator 113. The timing signals are sent to the registers, the MPXes and the CRC unit 150 respectively through lines from the Tx-FRAME CONT 110, some connections are indicated by asterisk numerals, for making the above parts and unit operate properly and for forming a frame as shown in FIG. 2.

Figure 9:
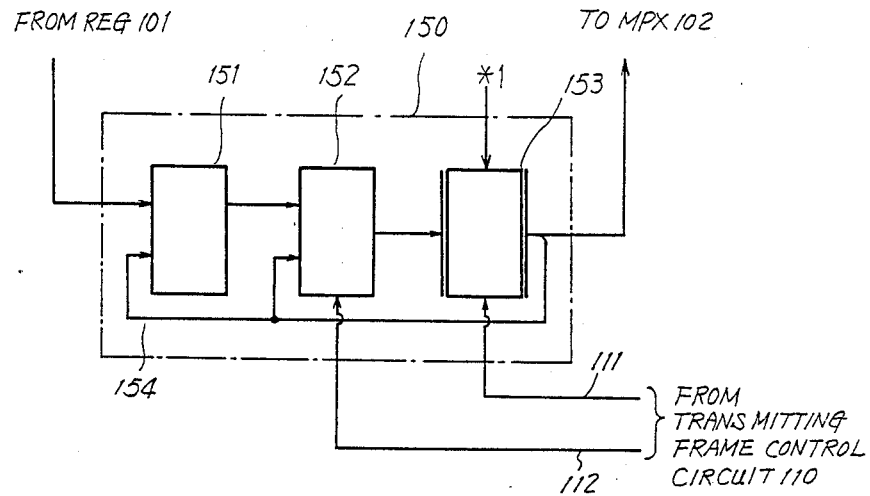
FIG. 9 is a block diagram for the prior art CRC unit in the transmitter circuit of the prior art.

FIG. 9 is a block diagram for a prior art Tx-CRC unit 150 in the transmitting circuit 100. The Tx-CRC unit 150 comprises a CRC code generating circuit (CRC GEN) 151, a CRC multiplexer (CRC MPX) 152, a CRC register (CRC REG) 153 and a feed back line 154. The information signal from the REG 101 is sent to the CRC GEN 151 in which the CRC code generation is performed. The output from the CRC GEN 151 is sent to the CRC MPX 152 by which the timing for checking signals in the frame is selected so as to exclude the check of the frame header 1. The output from the CRC MPX 152 is sent to the CRC REG 153 in which the timing for outputting the CRC code is determined by the timing signal (asterisked 1) from the Tx-FRAME CONT 110. The output of the CRC REG 153 is sent to the MPX 102 and at the same time, fed back to the CRC GEN 151 and the CRC MPX 152 by the feed back line 154. This feed back is for excluding the frame header 1 in cooperation with the timing signals sent from the Tx-FRAME CONT 110 through lines 111 and 112 as shown in FIGS. 7 and 9.

FIG. 8 is a block diagram of a receiving circuit 200 of the prior art in the interface circuit located at, for example, the IO unit 1b (see FIG. 1). In FIG. 8, the optical information signal sent from the transmitting circuit 100 in, for example, the channel unit 1a through, for example, the optical fiber 1c-1 is received by an optical receiver 201 in which the optical information signal is converted into the electrical information signal. The information signal from the optical receiver 201 is sent to a shift REG 202 in which the information signal arranged in the serial transfer form with the frames is converted to a parallel form composed of 12-bit signals and sent to a REG 203. The 12-bit signal from the REG 203 is sent to a code converter 204 in which the 12-bit signal is converted to a 9-bit signal. The 9-bit signal from the code converter 204 is sent to a REG 205. The 9-bit signal from the REG 205 is sent out from the receiving circuit 200 as an output thereof, and at the same time the 9-bit signal is sent to a Rx-CRC unit 250 in which the CRC code 5 is generated.

Figure 10:
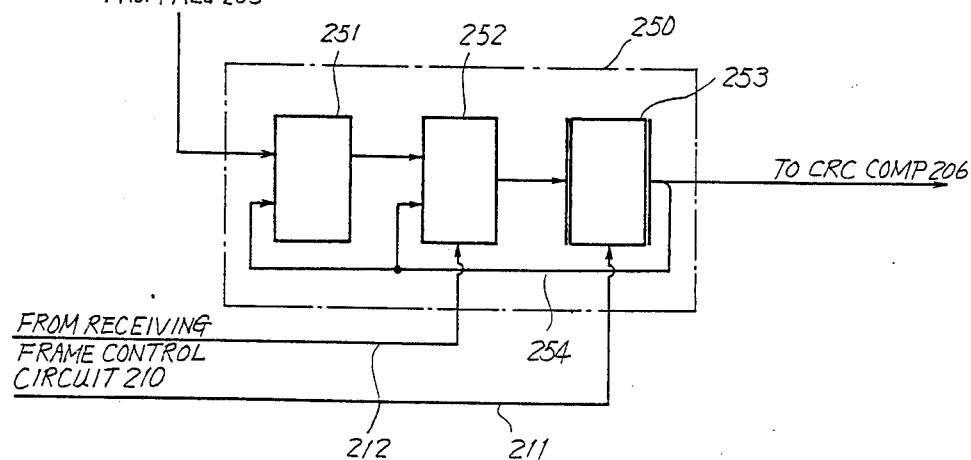
FIG. 10 is a block diagram for the prior art CRC unit in the receiving circuit of the prior art.

FIG. 10 is a block diagram of an Rx-CRC unit 250 of the prior art. As shown in FIG. 10, the Rx-CRC unit 250 a comprises a CRC GEN 251, a CRC MPX 252, a CRC REG 253 and a feed back line 254, and these circuits function the same as those in the Tx-CRC unit 150 explained in reference with FIG. 9. The CRC code 5 from the Rx-CRC unit 250 is sent to a CRC code comparator (CRC COMP) 206.

The 9-bit signal from the REG 205 is also sent to the CRC COMP 206 in which the CRC code 5 sent from the transmitter circuit 100 is selected by a timing signal from a receiving frame control circuit (Rx-FRAME CONT) 210. In the CRC COMP 206, the CRC code 5 sent from the transmitting circuit 100 and the CRC code 5 produced in the Rx-CRC unit 250 are compared to each other, and if there is an error in the information signal in the frame, an error signal is output through a flip flop (FF) circuit 207.

The 12-bit signal from the REG 203 is sent to a frame header comparator (FRAME COMP) 208 in which the frame header of the received information signal and the frame header from the frame header pattern generator are compared. The frame header pattern generator is not depicted in FIG. 8 but located in the interface circuit in, for example, the IO unit 1b, and produces the same pattern as that produced in the transmitting circuit 100. The output from the FRAME COMP 208 is sent to the Rx-FRAME CONT 210 in which various timing signals are generated in synchronization with the output from the FRAME COMP 208. The timing signals are sent to the REGes, the MPXes, comparators and the CRC unit 250 as shown in FIG. 8.

Thus, in the prior art, the error check for the information signal is performed not only on the control and data signals 3 and 4 but also on the dummy codes 2, which causes a decrease in the transfer speed of signal through the interface line as discussed before.

Figure 4:
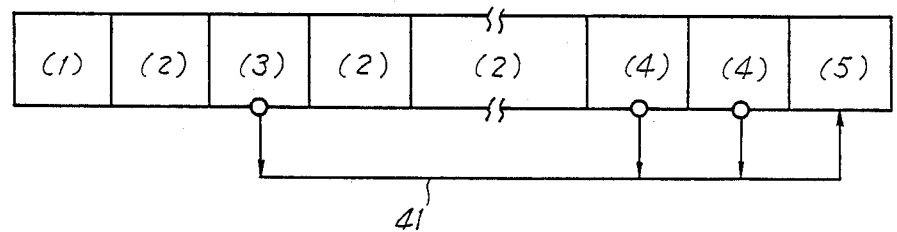
FIG. 4 is a figure for illustrating the construction of the frame in which the CRC checking objects, in the present invention, for the information signal are shown.

The present invention intends to exclude the dummy code 2 from the object of the error check for the whole information signal, so that the control signal 3 and the data signal 4 become the object of the error check. This object is schematically indicated by a line 41 in FIG. 4; wherein, FIG. 4 illustrates the same frame construction as frame 30 as in FIG. 2. As seen from FIG. 4, in the present invention, the number of the object (small circles) of the error check is reduced in comparison with that in FIG. 2, which results in increasing the signal transfer speed.

The present invention will be described in accordance with two embodiments, a first and a second embodiment. In these embodiments, the attribute flag "0 0" for the dummy codes 2 and the dummy codes 2 themselves are excluded from the error check object in the first frame. The first frame and the second frame which will be stated below are defined that the first frame is the frame just in front of the second frame as defined before.

Figure 5:
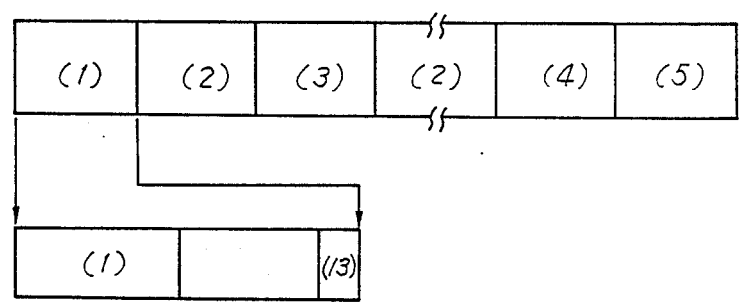
FIG. 5 is a figure for illustrating the construction of the frame header in a first embodiment of the present invention.

However, adding the above, in the first embodiment, the transmitting circuit 100 and the receiving circuit 200 of the prior art are improved so as to avoid the re-transmission of the information signal in the first frame occurring when the attribute flag "0 0" in the first frame is changed to "0 1" and there is no data signal 4 is in the first frame. This improvement is carried out in cooperation with a first flag 13 newly provided at the frame header 1 in the second frame as shown in FIG. 5, for informing the receiving circuit whether at least one control signal 3 is in the first frame. In FIG. 5, the parenthesized numeral (13) indicates the set position of the first flag 13.

Figure 11:
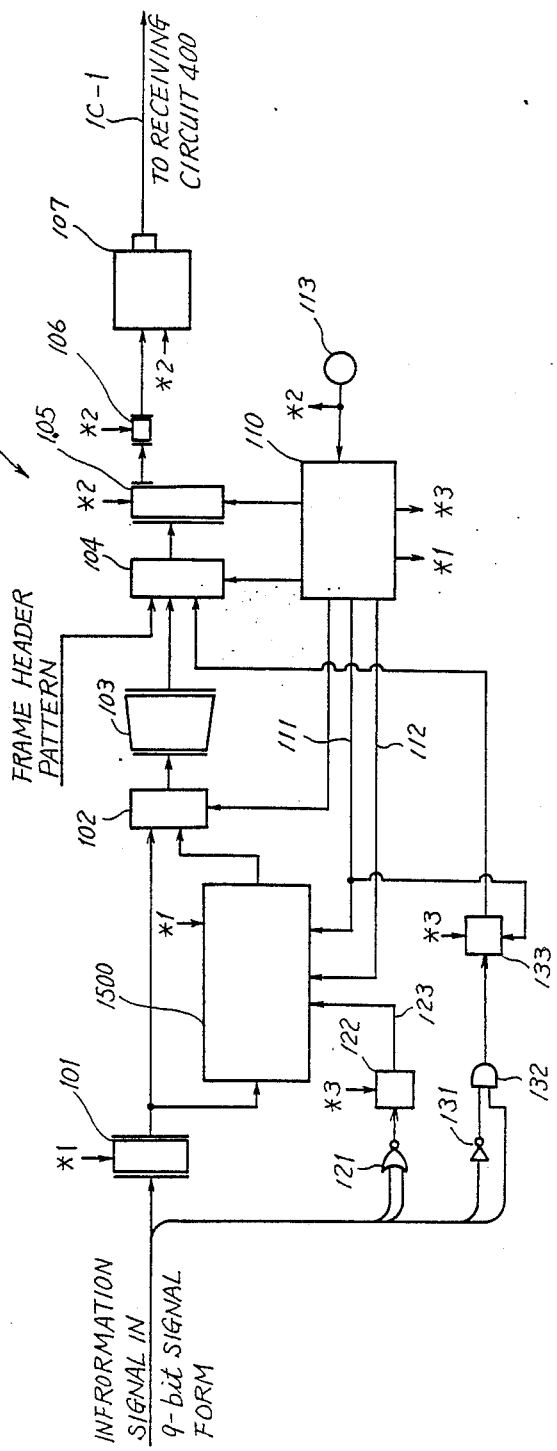
FIG. 11 is a block diagram for a transmitter circuit embodying the present invention.

A block diagram in FIG. 11 is a transmitting circuit 300 embodying the present invention. In FIG. 11, the same numerals as in FIG. 7 designate the same parts as in FIG. 7.

In FIG. 11, the attribute flag "0 0" is detected by an NOR 121 and bit "1" is produced only when the "0 0" in the first frame is input. The bit "1" is sent to a Tx-CRC unit 1500 through a flip flop circuit (FF) 122 which is for resetting. The Tx-CRC unit 1500 has the same construction as that of the Tx-CRC unit 150 as shown in FIG. 13. In FIG. 13, the same reference numerals as in FIG. 9 designates the same parts as in FIG. 9, and the function is modified so as to exclude the attribute flags "0 0" and the dummy codes 2 in the first frame from the CRC checking object. This modification is performed by applying the bit "1" from the FF 122 through a line 123. That is, when the bit "1" from the FF 122 is sent to the CRC MPX 152, the timing for producing the CRC code for the attribute flag "0 0" and the dummy codes 2 is removed at the CRC MPX 152, so that the CRC codes for checking the flags "0 0" and the dummy codes 2 in the first frame are excluded.

In FIG. 11, when the attribute flag "0 1" for the control signal 3 is included in the first frame, an NOT 131 and an AND 132 detects the "0 1" and produces bit "1". Then, the bit "1" is sent to the MPX 104, through the FF 133, in which the bit "1" is added as the first flag 13 to the frame header 1 as shown in FIG. 5.

Figure 12:
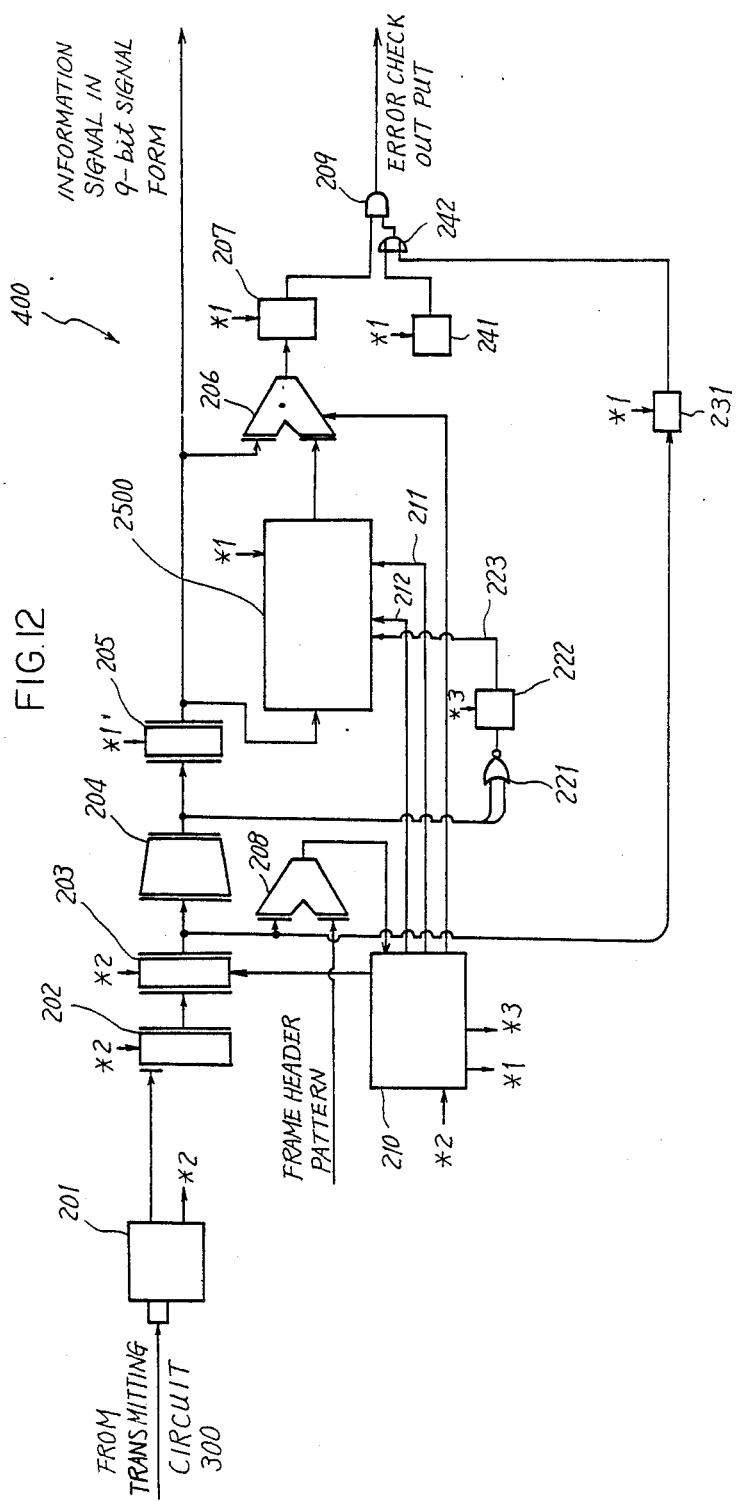
FIG. 12 is a block diagram for a receiving circuit embodying the present invention.

FIG. 12 shows a block diagram of the receiving circuit 400 embodying the present invention. In the FIG. 12, the same reference numerals as in FIG. 8 designates the same parts as in FIG. 8.

In FIG. 12, an NOR 221 and an FF 222 and an Rx-CRC unit 2500 function same as the NOR 121, the FF 122 and the Tx-CRC unit 1500 for excluding the attribute flags "0 0" and the dummy codes 2 in the first frame from the CRC checking object in the first frame. FIG. 14 shows the block diagram for the Rx-CRC unit 2500 which functions the same as the Tx-CRC unit 1500 shown in FIG. 13.

In FIG. 12, when the bit "1" of the first flag 13 is included in the second frame, the bit "1" and is detected by the first flag detector 231 which produces a bit "1". The bit "1" from the first flag detector 231 is sent to an AND 209 through an OR 242 from which a final error check output of the receiving circuit 400 is output. To the AND 209, another input from the FF 207 is sent so that bit "1" is sent when there is a CRC error as explained in reference with FIG. 8. A FF 241 is for informing to the receiver circuit 400 whether the data signal 4 is transferred with the first frame. When the data signal 4 is transferred through the interface line with the first frame, the FF 241 receives that information from, for example, a control unit, which is not depicted in FIG. 12, of the data processing system, and outputs bit "1" to the OR 242.

As a result, the error check output of the receiving circuit 400 is finally obtained as follows:

(1) when the FF 207 produces bit "0" as the output, in other words, when there is no CRC error in the first frame, the output from the AND 209 is "0", which means that there is no error in the first frame;

(2) when the FF 207 outputs bit "1", in other words, when there is an CRC error, but when the FF 241 and and the first flag detector 231 output bit "0", in other words, when there are no data signal 4 and no control signal 3 in the first frame, the output from the AND 209 becomes "0", which means that even though there is an error in the first frame the error is due to the attribute flags "0 0" in the first frame, so that the error can be neglected; and (3) when the FF 207 outputs bit "1" and the output of either FF 241 or the first flag detector 231 is "1", the output of the AND 209 becomes "1", which means that even though the CRC error is actually produced by the simple error due to the attribute flag "0 0" such that "0 0" is changed to "1 x" or "0 1", it must be considered that there might be an error due to the data signal 4 or the control signal 3 in the first frame, so that bit "1" must be taken as the error in the first frame. Then the final error output "1" is used for re-transmitting the first frame, these circuits are not depicted in FIG. 12.

Thus, according to the first embodiment, if there are only dummy codes 2 in the first frame and one (or some) of the attribute flag "0 0" is changed to "0 1", the error from the CRC checking is neglected. Hereupon, in the first embodiment, only the attribute flag "0 0" is the object of the CRC checking. This is because the control signal 3 is always transferred in double as stated in reference with FIG. 3(b), so that an error from the control signal 3 itself can be checked by comparing the double control signals. In the case of the data signal 4, the error check by using the attribute flag "0 x" cannot be done because the double transfer is not performed for the data signal 4. This is why the FF 241 is provided in the receiving circuit.

However, there is a problem in the first embodiment that if the control signal 3 is included in the first frame, it is impossible to neglect the CRC error even though actually the CRC error comes from the the error of the attribute flag "0 0". The second embodiment is for solving this problem.

Figure 6:
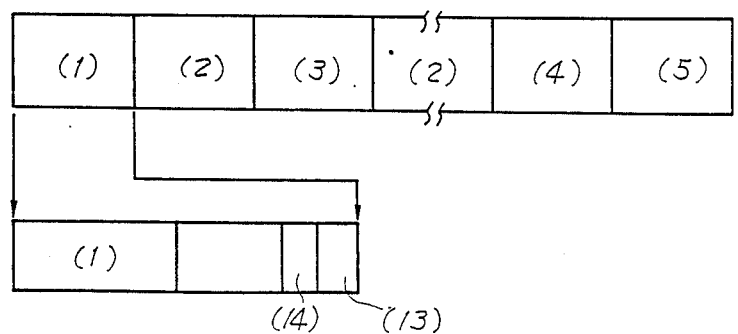
FIG. 6 is a figure for illustrating the construction of the frame header in a second embodiment of the present invention.

In the second embodiment, a second flag 14 is further provided at the frame header 1 in the second frame as shown in FIG. 6. The second flag 14 is for informing the lowest digit bit of the number of the control signals 3 in the first frame. FIGS. 15 and 16 are the transmitting circuit 500 and the receiving circuit 600 embodying the present invention. In FIG. 15 (and 16), the same reference numerals as in FIG. 11 (and 12) designate the same parts which function the same as those in FIG. 11 (and 12).

In the transmitting circuit 500 shown in FIG. 15, every time the attribute flag "0 1" is sent to the NOT 131 and the AND 132, bit "1" is output from the AND 132 and is sent to the MPX 104 for providing the first flag 13 in the second frame, which is same as in FIG. 11. In this second embodiment, the bit "1" is sent to a counter 134 in which the lowest digit bit of the number of the attribute flag "0 1" in the first frame is counted and sent to the MPX 104 through a line 136 for providing the second flag 14 at the frame header 1 of the second frame. Therefore, the first and the second flags 13 and 14 are arranged at the frame header 1 of the second frame as shown in FIG. 6.

In the receiving circuit 600 shown in FIG. 16, attribute flag "0 1" in the received information signal in the first frame is detected by an NOT 232 and an AND 233, and at the same time, the double check of the the control signal 3 is performed by a control signal comparator (CONT-SIG COMP) 261. As explained in reference with FIG. 3(b), the control signal 3 is arranged double so as to be set in the sub-units 21 and 22. So, the double control signals 3 in the sub-units 21 and 22 are sent to the CONT-SIG COMP 261 from the input and the output of the REG 205 respectively and compared to each other. When the double control signals 3 are equal, bit "1" is produced from the CONT-SIG COMP 261 and sent to the AND 233. Therefore, the AND 133 produces bit "1" as an output as long as the "0 1" is true attribute flag for the control signal 3, in other words, the AND 133 never produces bit "1" even though the attribute flag "0 0" is changed to "0 1" during the signal transmission. The output "1" from the AND 233 is sent to the counter 235 in which the lowest digit bit of the counted number of the attribute flags "0 1" in the first frame is produced and output. The lowest digit bit from the counter 234 is compared with the second flag 14 at a second flag comparator 235, and the second flag comparator 235 outputs bit "1" when they do not conicided. The bit of the second flag 14 is sent from REG 203 through a line 238. The output from the comparator 235 and the bit of the first flag 13 are sent to the AND 236, and its output is sent to an OR 243 through an FF 237. The output from the AND 242 is also sent to the OR 243, so that either output from the AND 242 or that from the AND 236 is "1", the OR 243 outputs bit "1" for informing that there is error in the first frame.

As a result, the error check output of the receiving circuit 600 is obtained as follows:

(1) when the output bit of the FF 207 and that of the AND 236 are "0", in other words, when there is no CRC error in the first frame, the output of the OR 243 is "0", which means that there is no error in the first frame;

(2) when the output bit of the FF 207 is "1", in other words, when there is an CRC error, but if the FF 241 outputs bit "1", the output from the OR 243 is "1", which means that as long as the data signal 4 is in the first frame, it is judged that there is an error in the first frame; and (3) when the output bit of the FF 207 is "1" and the output from the FF 241 is "0", the output of the OR 243 becomes "0" unless the output of the AND 236 is "1", which means that when the data signal 4 is not in the first frame, the CRC error is neglected even though there are the control signals 3 in the first frame because the number of the control signals 3 is coincided, so the it is judged that attribute flag "0 0" itself must have an error.

Thus, in the second embodiment, the problem in the first embodiment is solved.

In the first and the second embodiments, the transmitting and the receiving circuits are explained as those in a unit such as the channel unit or the IO unit in a data processing system. However, the present invention can be applied to any system for transferring signals from a signal transmitting means to a signal receiving means through a signal transmission means.

What is claimed is:

1. A method for detecting errors in information signals transferred from signal transmitting means to signal receiving means through signal transmission means as frames arranged in a serial transfer form, said method comprising the steps of:

providing, at the signal transmitting means, dummy codes in the frame instead of the information signals if there is no information signal in the frame;

providing, sat the signal transmitting means, attribute flags in the frame for identifying attributes of the information signals and said dummy codes in the frame;

providing, at the signal transmitting means, a first check code in the frame for checking errors of said attribute flags and the information signals in the frame, excluding said attribute flags for said dummy codes and said dummy codes;

providing, at the signal receiving means, a second check code based on received information signals in the frame, for checking errors of said attribute flags and the information signals in the frame, excluding said attribute flags for said dummy codes and said dummy codes;

detecting , at the signal receiving means, said first check code; and comparing, at the signal receiving means, said first check code with said second check code.

2. A method according to claim 1, wherein said first check code and said second check code are a cyclic redundancy check code respectively.

3. A method for detecting errors of information signals, each including a first signal and a second signal, transferred from signal transmitting means to signal receiving means through signal transmission means with frames arranged in a serial transfer form, wherein said first signal is a signal to be placed double in the frame and said second signal is a signal to be provided in the frame with a third signal given to the signal receiving means for informing to the signal receiving means that said second signal is in the frame, said method comprising the steps of:

providing, at the signal transmitting means, dummy codes in the frame instead of information signals if there is no information signal in the frame;

providing, at the signal transmitting means, attribute flags in the frame for informing attributions of the information signals and said dummy codes in the frame, providing, at the signal transmitting means, a first check code in the frame for checking errors of said attribute flags and the information signals in the frame, excluding said attribute flags for said dummy codes and said dummy codes;

providing, at the signal transmitting means, a first flag to a beginning parts of a second frame for informing whether the first signal is in a first frame; wherein said first frame and said second frame are successive frames;

providing, at the signal receiving means, a second check code for checking errors of said attribute flags and the information signals in the first frame, excluding said attribute flags for said dummy codes and said dummy codes;

detecting, at the signal receiving means, said first check code;

comparing, at the signal receiving means, said first check code with said second check code and producing a first output for informing that an error is detected by said comparison and a second output for informing that an error is not detected by said comparison;

detecting, at the signal receiving means, said first flag in the second frame and producing a third output for informing that the first signal has existed in the first frame when the first flag is detected and a fourth output for informing that the first signal has not existed in the first frame when the first flag is not detected;

receiving, at the signal receiving means, information whether the second signal is in the first frame and producing a fifth output for informing that there is the second signal when said information informs that there is the second signal in the first frame and a sixth output for informing that there is no second signal in the first frame;

outputting, at the signal receiving means, a first final output signal for informing that non-error exists in the first frame when said second output is output;

outputting, at the signal receiving means, said first final output signal when said first output, said fourth output and said sixth output exist;

outputting, at the signal receiving means, said first final output signal when said first output, said fourth output and said sixth output exist;

outputting, at the signal receiving means, a second output signal for informing that error exists in the first frame when first output and only said third output exist; and outputting, at the signal receiving means, said second output signal when first output and said fifth output exist.

4. A method according to claim 3, said method further comprising the steps of:

counting, at the transmitting means, the number of the attribute flags for the first signals in the first frame and producing the lowest digit bit of said number;

providing, at the transmitting means, a second flag in the beginning parts of the first frame for informing said lowest digit bit;

performing, at the signal receiving means, double checking of the first signal and producing a seventh output for informing that the first signal is correctly received and eighth output for informing that the first signal is incorrectly received;

detecting, at the signal receiving means, the attribute flags for the first signal in the first frame, counting the number of the first signal in the first frame and producing the lowest digit bit of said number;

comparing, at the signal receiving means, said digit bit counted at the signal receiving means with said second flag and producing a ninth output for informing that said digit bit and said second flag are coincided and a tenth output for informing that said digit bit and said second flag are not coincided;

producing, at the signal receiving means, a eleventh output for informing that said third output, said seventh output and said ninth output exist; and outputting, at the signal receiving means, said first final output signal when not only said first output and said third output but also said eleventh output exist.

5. A method according to claim 4, wherein said first check code provided at the signal transmitting mean and said second check code provided at the signal receiving means are a cyclic redundancy check code respectively.

6. A method according to claim 3, wherein said first check code provided at the signal transmitting means and said second check code provided at the signal receiving means are a cyclic redundancy check code respectively.

7. A system for detecting errors of information signals, each including a first signal and a second signal, transferred from signal transmitting means to signal receiving means through signal transmission means with frames arranged in a serial transfer form, wherein said first signal is to be placed double in the frame and said second signal is a signal to be provided in the frame with a third signal given to the signal receiving means for informing to the signal receiving means that said second signal is in the frame, said system comprising:

means, in the signal transmitting means, for providing dummy codes in the frame instead of information signals if there is no information signal in the frame;

means, in the signal transmitting means, for providing attribute flags in the frame for informing attributions of the information signals and said dummy codes in the frame, means, in the signal transmitting means, for providing a first check code in the frame for checking errors of said attribute flags and the information signals in the frame excluding said attribute flags for said dummy codes and said dummy codes;

means, in the signal transmitting means, for providing a first flag to a beginning parts of a second frame for informing whether the first signal is in a first frame; wherein said first flame and said second frame are successive frames;

means, in the signal receiving means, for providing a second check code for checking errors of said attribute flags and the information signals in the first frame, excluding said attribute flags for said dummy codes and said dummy codes;

means, in the signal receiving means, for detecting said first check code;

means, in the signal receiving means, for comparing said first check code with said second check code and producing a first output for informing that an error is detected by said comparison and a second output for informing that an error is not detected by said comparison;

means, in the signal receiving means, for detecting said first flag in the second frame and producing a third output for informing that the first signal has existed in the first frame when the first flag is detected and a fourth output for informing that the first signal has not existed in the first frame when the first flag is not detected;

means, in the signal receiving means, for receiving information whether the second signal is in the first frame and producing a fifth output for informing that there is the second signal when said information informs that there is the second signal in he first frame and a sixth output for informing that there is no second signal in the first frame;

means, in the signal receiving means, for outputting a first final output signal for informing that non-error exists in the first frame when said second output is output;

means, in the signal receiving means, for outputting said first final output signal when said first output, said fourth output and said sixth output exist;

means, in the signal receiving means, for outputting said first final output signal when said first output, said fourth output and said sixth output exist;

means, in the signal receiving means, for outputting a second output signal for informing that error exists in the first frame when first output and only said third output exist; and means, in the signal receiving means, for outputting said second output signal when first output and said fifth output exist.

8. A system according to claim 7, said system further comprising:

means, in the transmitting means, for counting the number of the attribute flags for the first signals in the first frame and producing the lowest digit bit of said number;

means, in the transmitting means, for providing a second flag in the beginning parts of the first frame for informing said lowest digit bit;

means, in the signal receiving means, for performing double checking of the first signal and producing a seventh output for informing that the first signal is correctly received and eighth output for informing that the first signal is incorrectly received;

means, in the signal receiving means, for detecting the attribute flags for the first signal in the first frame, counting the number of the first signal in the first frame and producing the lowest digit bit of said number;

means, in the signal receiving means, for comparing said digit bit counted at the signal receiving means with said second flag and producing a ninth output for informing that said digit bit and said second flag are coincided and a tenth output for informing that said digit bit and said second flag ar not coincided;

means, in the signal receiving means, for producing a eleventh output for informing that said third output, said seventh output and said ninth output exist; and means, in the signal receiving means, for outputting said first final output signal when not only said first output and said third output but also said eleventh output exist.

9. A system according to claim 8, wherein said means for providing said second check code in the signal receiving means is a cyclic redundancy checking circuit.

10. A system according to claim 7, wherein said means for providing said first check code in the signal transmitting means is a cyclic redundancy checking circuit.

* * * * *

UNITED STATES PATENT AND TRADEMARK OFFICE
CERTIFICATE OF CORRECTION

PATENT NO.   :   4,939,732
DATED        :   July 3, 1990
INVENTOR(S)  :   KOICHI OKAMOTO et al.

It is certified that error appears in the above-identified patent and that said Letters Patent is hereby corrected as shown below:

```
Col. 5,  line 23, "4 s" should be --4 so--;
Col. 11, line 36, "sat" should be --at--;
Col. 12, line 15, "parts" should be --part--;
Col. 13, line 2,  "parts" should be --part--;
Col. 13, line 27, "mean" should be --means--;
Col. 14, line 20, "he" should be --the--.
```

Signed and Sealed this

Seventeenth Day of September, 1991

Attest:

HARRY F. MANBECK, JR.

*Attesting Officer*      *Commissioner of Patents and Trademarks*